United States Patent
Strobbia

(10) Patent No.: US 7,917,295 B2
(45) Date of Patent: Mar. 29, 2011

(54) MODELING AND FILTERING COHERENT NOISE IN SEISMIC SURVEYING

(75) Inventor: Claudio L. Strobbia, Pavia (IT)

(73) Assignee: WesternGeco L.L.C., Houston, TX (US)

( * ) Notice: Subject to any disclaimer, the term of this patent is extended or adjusted under 35 U.S.C. 154(b) by 485 days.

(21) Appl. No.: 12/112,504

(22) Filed: Apr. 30, 2008

(65) Prior Publication Data

US 2009/0276159 A1  Nov. 5, 2009

(51) Int. Cl.
*G06F 11/00* (2006.01)
(52) U.S. Cl. ......................................................... 702/14
(58) Field of Classification Search .................... 702/14, 702/17, 182–185, 188
See application file for complete search history.

(56) References Cited

U.S. PATENT DOCUMENTS 5,067,112 A    11/1991   Meek et al.
6,668,228 B1 *  12/2003  Ozbek et al. ..................... 702/17

OTHER PUBLICATIONS

McMechan, et al., Analysis of Dispersive Wave by Wave Field Transformation, Geophysics, 1981, pp. 869-874, vol. 46.
S.T. Hildebrand, Two Representations of the Fan Filter, Geophysics, 1982, pp. 957-959, vol. 47.
Strobbia, et al., Multi-Offset Phase Analysis of Surface Wave Data (MOPA), Journal of Applied Geophysics, 2006, pp. 300-313, vol. 59, Issue 4.

* cited by examiner

*Primary Examiner* — Edward Raymond

(57) ABSTRACT

Seismic data collected by a group of seismic receivers is received, and properties of coherent noise for plural modes of the coherent noise based on the received seismic data are computed to produce a model of the coherent noise for the plural modes. Using the model, the coherent noise is simulated to generate a synthetic noise.

20 Claims, 4 Drawing Sheets

MODELING AND FILTERING COHERENT NOISE IN SEISMIC SURVEYING

TECHNICAL FIELD

The invention relates to modeling and filtering noise in seismic surveying.

BACKGROUND

Seismic surveying is used for identifying subterranean elements, such as hydrocarbon reservoirs, fresh water aquifers, gas injection reservoirs, and so forth. In performing seismic surveying, seismic sources and seismic receivers can be placed at various locations on an earth surface (e.g., a land surface or a sea floor), or even in a wellbore, with the seismic sources activated to generate seismic waves. Examples of seismic sources include explosives, air guns, acoustic vibrators, or other sources that generate seismic waves.

Some of the seismic waves generated by a seismic source travel into a subterranean structure, with a portion of the seismic waves reflected back to the surface (earth surface, sea surface or sea floor, or wellbore surface) for receipt by seismic receivers (e.g., geophones, hydrophones, etc.). These seismic receivers produce signals that represent detected seismic waves. Signals from the seismic receivers are processed to yield information about the content and characteristics of the subterranean structure.

In seismic surveying, coherent noise can contaminate seismic signals detected by seismic receivers. "Coherent noise" refers to seismic source-induced noise that mainly includes horizontally-traveling waves confined in the so called near surface (a weathered layer adjacent the surface). The horizontally-traveling waves travel from the seismic source to seismic receivers. Generally, the coherent noise waves travel at a relatively low velocity when compared to waves associated with useful signals (signals reflected from the subterranean structure that is being surveyed).

Conventional filtering techniques separate useful signals from coherent noise based on the velocity difference between the useful signal and the noise. For example, a velocity filter can be used to remove signal components having energy within a particular range of velocities. Examples of velocity filters include an f-k filter, tau-p filter, and so forth. However, a shot gather having a three-dimensional (3D) acquisition geometry prevents straightforward application of certain types of velocity filters. A "shot gather" refers to seismic traces collected in response to multiple shots of multiple sources (where the multiple sources can actually be a single source moved across different positions). Moreover, near-surface wave phenomena typically have multiple modes of propagation, which can be superimposed onto the useful signal. Conventional noise filtering techniques may not be accurate when multiple modes of noise are present.

SUMMARY

In general, according to an embodiment, a method includes receiving seismic data collected by a group of seismic receivers, and computing properties of coherent noise for plural modes of the coherent noise based on the received seismic data to produce a model of the coherent noise for the plural modes. Using the model, the coherent noise is simulated to generate a synthetic noise.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a technique or mechanism is provided to model coherent noise (having a plurality of modes) associated with seismic data having a three-dimensional (3D) geometry. 3D seismic data results from seismic sources and receivers not being aligned during the surveying operation (for example, seismic receivers can be deployed along a line in a first direction, and seismic sources can be deployed along a line in a second, different direction). The model of the coherent noise can be used in a simulation to generate synthetic noise. The synthetic noise can then be subtracted from seismic data to perform noise filtering on the seismic data.

Parameters of the noise model for each of the plural modes are estimated based on analyzing seismic data, such as seismic data collected over multiple shot gathers. The noise model parameters can then be kept constant, and simulation can then be performed using the model that is defined according to the model parameters to produce synthetic noise having the plural modes.

Examples of modes of propagation of coherent noise include Rayleigh waves, Lamb waves, Flexural waves, P-guided waves, Love waves, Scholte waves, and so forth.

Figure 1:
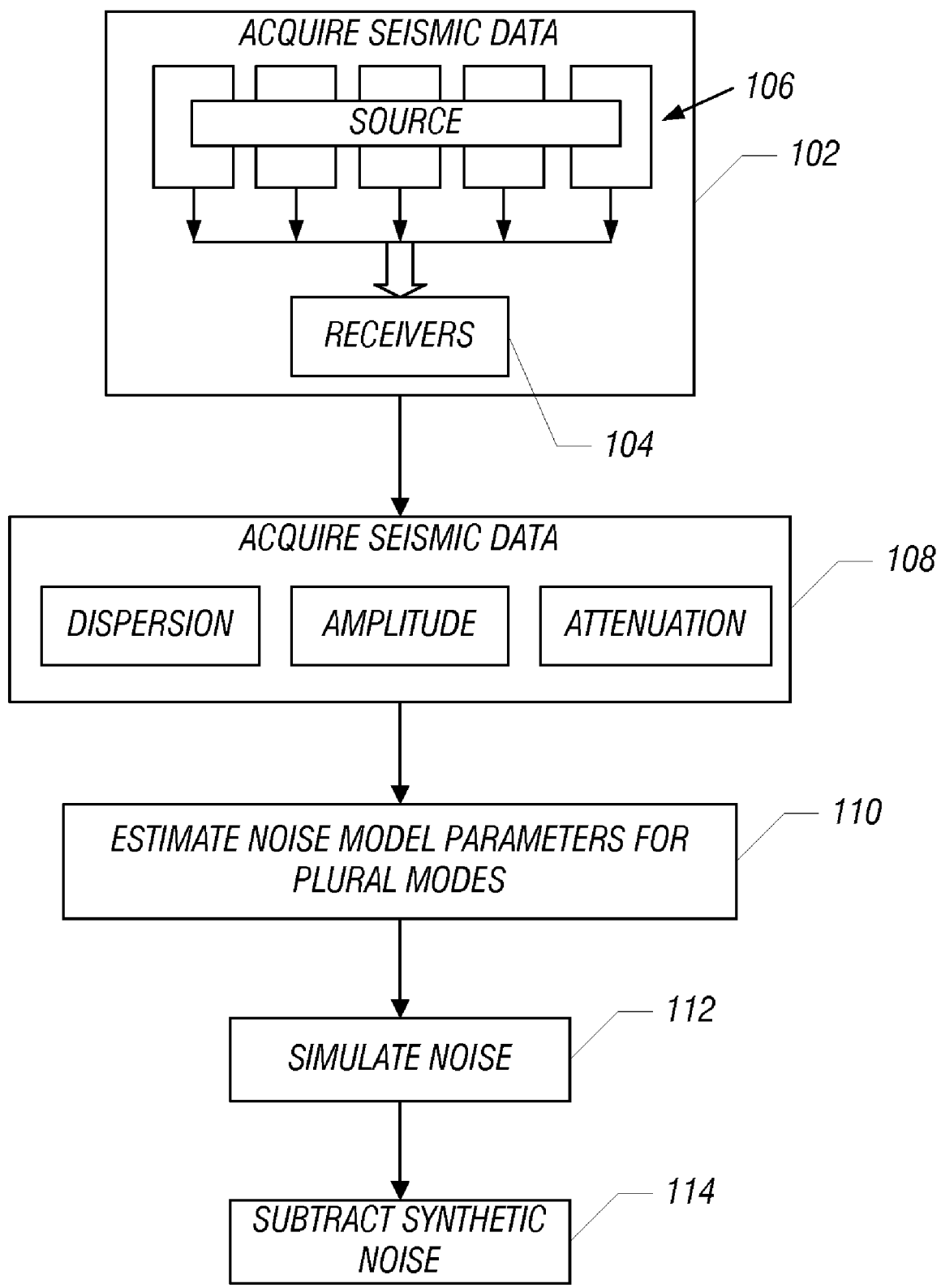
FIG. 1 is a flow diagram of a general process of coherent noise filtering, according to an embodiment.

FIG. 1 illustrates a general flow of a process according to one embodiment. First, seismic data is acquired (102) where the seismic data is collected by a group of receivers, which can be a line of receivers or an array (patch) of receivers. The receivers 104 are used to collect plural shot gathers, where a "shot gather" refers to seismic traces collected by the receivers for shots associated with multiple sources. The multiple sources are generally represented as 106 in FIG. 1. The multiple sources 106 can actually be a single source that has been moved to different positions and activated at different times at the different positions.

The seismic data collected by the receivers 104 for the various shot gathers are analyzed (at 108). Based on the analysis, noise propagation properties for plural modes are estimated (at 110), where the noise propagation properties are represented by the noise model parameters mentioned above. In some embodiments, the noise model parameters include a dispersion parameter, an amplitude parameter, and an attenuation parameter. Note that the noise model parameters are estimated for each of the plural modes, such that the plural modes are associated with respective sets of noise model parameters. In this way, the coherent noise is explicitly separated into multiple modes, with each of the modes separately represented by respective sets of noise model parameters.

Using the noise model according to the parameters estimated at 110, the coherent noise can be simulated (at 112) to produce synthetic noise. The synthetic noise is then subtracted (at 114) from seismic data to perform filtering to remove the coherent noise having the plural modes.

Using techniques according to some embodiments, the noise wavefield is decomposed into plural modes, and the noise propagation properties of the noise wavefield are assessed based on seismic data collected by the group of receivers 104 in response to a number of shots of the seismic sources 106. The noise properties are estimated locally, considering gathered information. The locally estimated noise properties are then used to filter separately each of the shots.

A simple coherent noise model that can be used is based on summing the individual near-surface modes. One example of such a simple model is as follows:

$$u(x,f) = A(f) \cdot e^{-i(\phi_s(f) - K(f) \cdot X)} \cdot e^{-D(f) \cdot X \cdot K(f)}, \quad (\text{Eq. 1})$$

where $u(x,f)$ represents the noise as a function of position x and frequency (f), $\phi_s(f)$ represents the phase of the source as a function of frequency, $K(f)$ is the wavenumber as a function of frequency, $A(f)$ is the average amplitude as a function of frequency and includes contribution of the source, path, and site, $D(f)$ is a damping ratio describing the relation between amplitude within a considered set of seismic traces, and X represents an offset. $K(f)$ is an example of a dispersion parameter (alternatively, the dispersion parameter can be a phase velocity); $A(f)$ is an example of an amplitude parameter; and $D(f)$ is an example of an attenuation parameter.

Eq. 1 represents the noise contribution of a single mode. If multiple modes are present, $u(x,f)$ is calculated individually for each of the modes (associated with different parameters $A(f)$, $K(f)$, $D(f)$, and the multiple contributions are summed or otherwise aggregated.

Figure 2A:
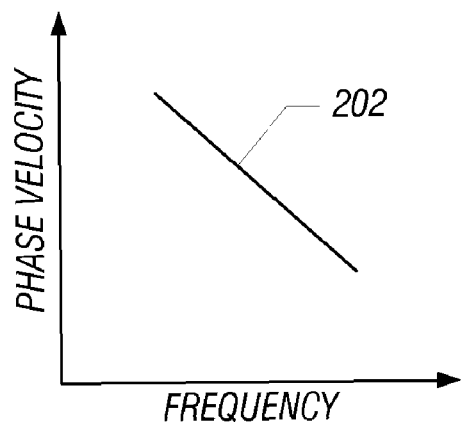
FIGS. 2A-2B are graphs illustrating a dispersion curve and amplitude curve produced using techniques according to some embodiments.
Figure 2B:
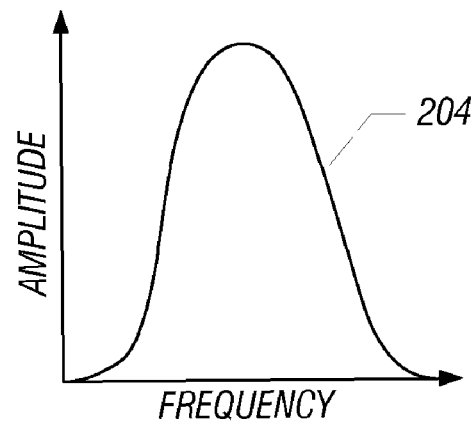

The parameters of Eq. 1 can be estimated locally from the seismic data collected by the receivers, from which a model of the coherent noise can be generated. For example, one technique of estimating model parameters from the seismic data is to use a two-dimensional wavefield transformation and to apply local analysis of spectral properties of traces. FIG. 2A shows an example chart having a graph 202 that represents phase velocity as a function of frequency. Phase velocity is equal to the frequency (f) divided by the wavenumber $K(f)$. FIG. 2B is a graph that illustrates a curve 204 that represents amplitude as a function of frequency (e.g., $A(f)$ in Eq. 1 above).

The curve 202 of FIG. 2A is referred to as a dispersion curve (and represents an example of a dispersion parameter mentioned above). A dispersion curve can thus be a curve that correlates phase velocity to frequency or wavenumber to frequency. The phase spectrum of the noise traces can be obtained from the dispersion curve, and the wavenumber can be transformed into a phase difference from the source phase. In some implementations, the dispersion curve is made to be smooth and regular to avoid secondary events and irregular traces.

The curve 204 in FIG. 2B is an amplitude curve, and represents an example of an amplitude parameter mentioned above. A similar curve can be produced for the attenuation parameter.

Figure 3:
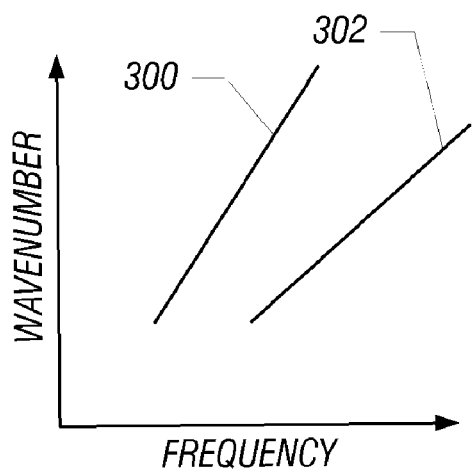
FIG. 3 is a graph that illustrates plural dispersion curves for corresponding modes, according to an embodiment.

If multiple modes are present, then the graphs produced will show multiple distinct curves corresponding to the different modes. An example is depicted in FIG. 3, which shows dispersion curves 300, 302 for two different modes (wavenumber as a function of frequency). Similar curves can be produced to illustrate multiple modes for the amplitude and attenuation parameters. The multiple curves are observable by a human. Alternatively, the multiple curves are detectable by software, from which the noise model parameters for multiple modes can be generated.

The noise event that is simulated by Eq. 1 is a single mode of a horizontally-traveling wave, with cylindrical spreading, exponential extenuation, and dispersion. The phase velocity versus frequency relation is unique for all the simulated traces, and the amplitude is obtained from the same amplitude spectrum imposing a frequency-dependent exponential attenuation. Given a set of traces containing signal and noise, the noise part can be estimated using techniques according to some embodiments with the noise model based on the parameters estimated above.

Figure 4:
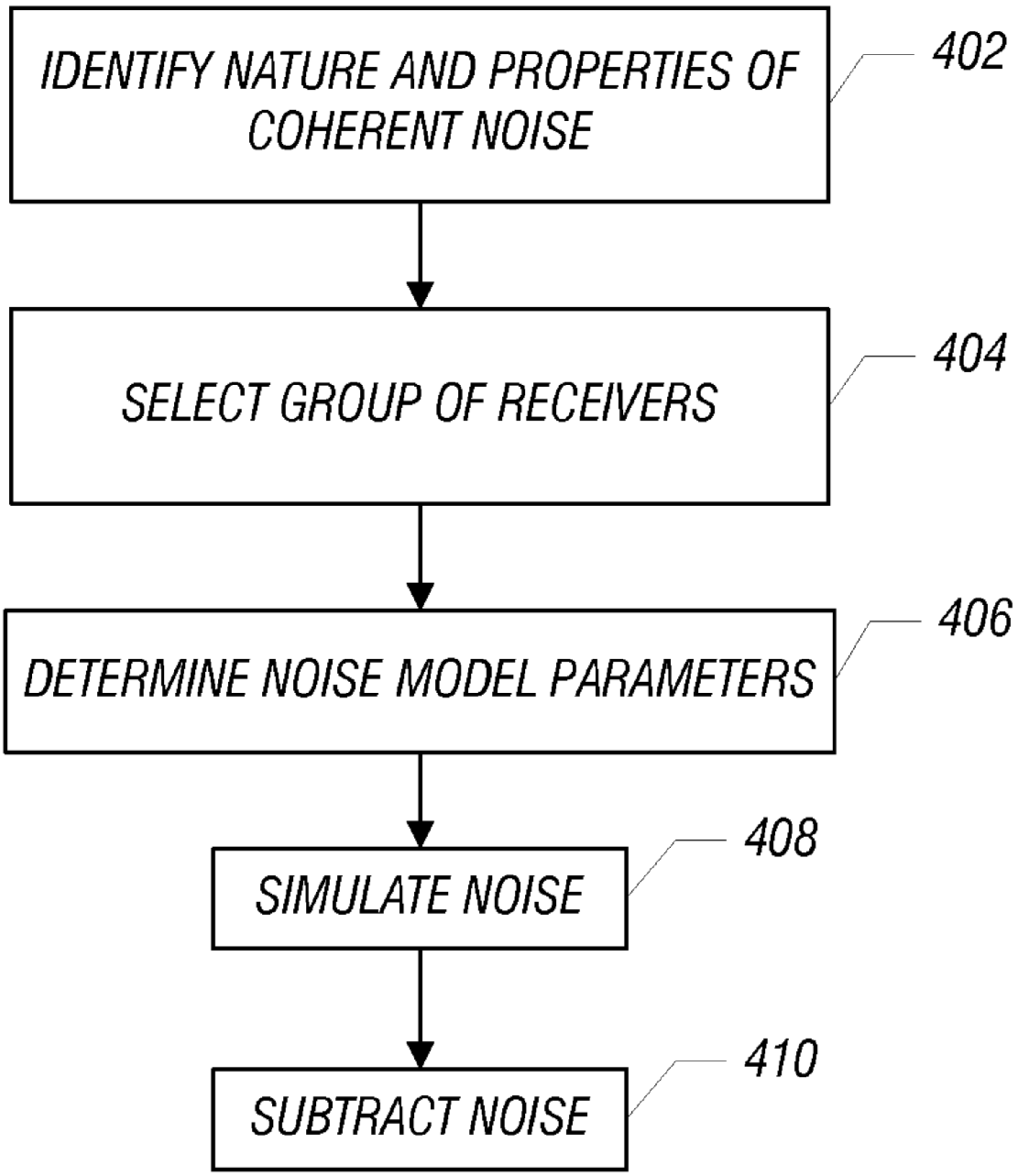
FIG. 4 is a flow diagram of a slightly more detailed process of coherent noise filtering, according to an embodiment.

FIG. 4 shows a process containing slightly more detailed tasks than the tasks depicted in FIG. 1. As shown in FIG. 4, the nature and properties of the coherent noise are identified (at 402). A number of shot gathers are selected (at 404), and if possible, with an in-line shot (a shot located along a receiver line), and with a wide range of offsets. The near surface modes are then classified, such as by detecting the multiple separate curves as discussed above. Moreover, lateral variations are also identified, where "lateral variations" refer to variations in noise properties along direction x (direction of seismic receivers). Lateral variations can use a priori information, such as information collected by satellite imaging, to identify different materials in the thin subsoil that can impact the near-surface coherent noise.

Next, based on the lateral variations identified, a group of receivers is selected (at 404) for applying noise filtering. The group of receivers selected can be some subset of all receivers. Note that a larger group of receivers is more greatly impacted by lateral variations than a smaller group of receivers. Using the lateral variations, splitting can be performed to split the receivers into distinct groups (or patches) that can be selected for application of noise filtering.

Next, the noise model parameters including dispersion and attenuation parameters are determined (at 406), such as by using f-k analysis for extracting the dispersion curves of the different modes. Note that the dispersion and attenuation parameters are estimated considering all selected seismic sources. However, amplitude parameters are estimated for each source, which is performed as part of the simulation at 408 below. Several shots are considered to increase stability and robustness of the estimate of the model parameters. An irregular f-k transform is applied to compute individual f-k panels that are stacked to obtain the dispersion curve. The f-k transform is a 2D Fourier transform that requires evenly-spaced seismic receivers. However, the seismic source may be offset from the line, resulting in irregularly-spaced receivers. Consequently, the irregular f-k transform is applied to handle this situation.

Alternatively, instead of using f-k analysis, local 1D regression of the trace phases can be performed, with spectral amplitude analysis run. Local 1D regression is based on the fact that phase is a linear function of source-receiver offset in a laterally homogeneous medium. Using the estimated phase-offset relationship, the dispersion curve can be obtained. A spectral amplitude analysis is also run to estimate attenuation curves, with the spectral amplitude analysis involving the changing of the azimuth of the source with respect to receivers and changing of the source offset.

Local high-resolution irregular (f-k) spectra are obtained for different shot gathers, with the f-k spectra stacked to obtain the coherent noise properties. The result can be a 2D pseudo-section of the Rayleigh wave velocity along each of the receiver lines. A 2D pseudo-section of the Rayleigh wave is an image of the Rayleigh wave velocity below the receiver line: it is not a section (but a pseudo-section) of Rayleigh wave velocity because the depth is not estimated. The velocity of Rayleigh waves varies with the frequency (hence with the wavelength) because the subsurface properties vary with depth. The velocity can be estimated with depth, or a pseudo-depth can be estimated simply as a fraction of the wavelength. Every dispersion curve provides a vertical profile of Rayleigh wave velocity. The 2D pseudo-section is therefore a plot of the Rayleigh wave velocity as a function of position along the line and pseudo-depth.

Next, the noise is simulated (at 408). The simulation involves first smoothing each dispersion curve to avoid fluctuations of the derivative of the dispersion curve. A rough dispersion curve may impact group velocity and may create secondary events in the synthetic traces created by the simulation. The phase versus offset relationship is estimated from the wavenumber, K, and the radial distance from the source, X, as $-K(f)*X$, and the source phase is estimated from the seismic data. Multiple passes are performed to consider each mode in sequence, to avoid mode mixing. The amplitude spectrum is locally estimated, which produces the average amplitude over multiple traces and the intrinsic attenuation is imposed. The simulation at 408 produces synthetic noise.

Next, this synthetic noise is subtracted (at 410) from seismic data. The estimated synthetic noise can be simply subtracted from the seismic data, or alternatively, by adapting the noise to be subtracted on a per trace basis.

Independent of the specific sequence of tasks depicted in FIG. 4, perturbation correction may be performed at some point, depending on the nature and character of the perturbations. Perturbation correction refers to the corrections of local (source or receiver) distortion of an ideal signal. The poor coupling of a receiver can result in distortion of the spectrum of all signals recorded by the receiver.

Figure 5:
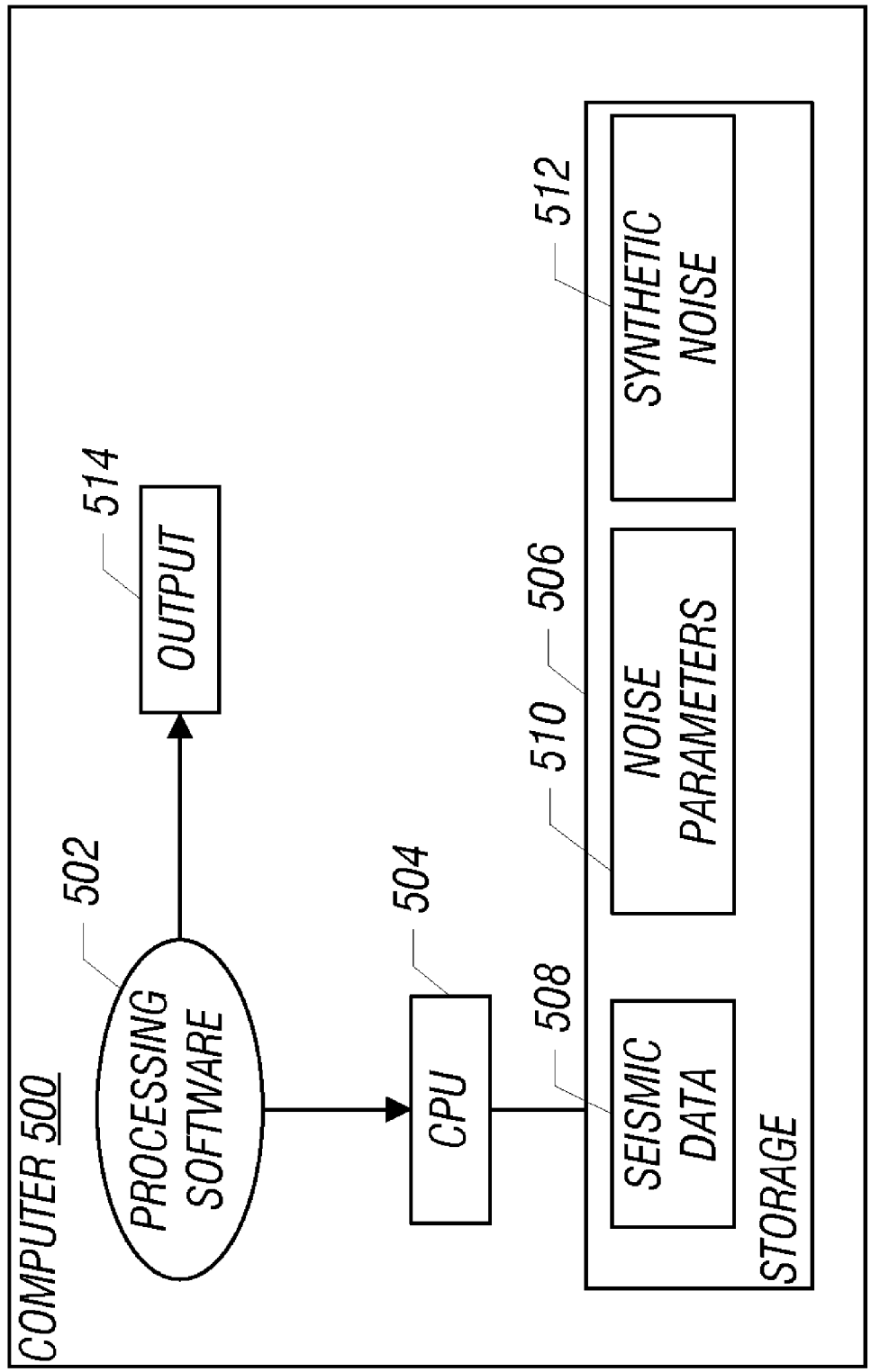
FIG. 5 is a block diagram of an example computer in which processing software according to an embodiment is executable.

FIG. 5 shows an example computer 500 that includes processing software 502 that is capable of performing the various tasks referred to above, including the tasks of FIGS. 1 and 4. The processing software 502 is executable on one or more central processing units (CPUs) 504, which is connected to a storage 506. The storage 506 contains seismic data 508 (seismic data received by receivers as part of seismic acquisition), noise parameters 510 (noise parameters computed by the processing software 502 based on the seismic data 508), and synthetic noise 512 (the synthetic noise produced based on simulation according to a model defined by the parameters 510).

The processing software 502 is able to generate an output 514, which can be any one or more of the following: seismic data with noise removed, a representation of the synthetic noise, and any other output. The output 514 can be in the form of a graphical user interface (GUI) output that is displayable in a display device, a report, or any other type of output format.

Instructions of the processing software 502 are loaded for execution on a processor (such as the one or more CPUs 504). The processor includes microprocessors, microcontrollers, processor modules or subsystems (including one or more microprocessors or microcontrollers), or other control or computing devices. A "processor" can refer to either a single component or multiple components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer having a non-transitory computer readable medium, comprising:
    receiving seismic data collected by a group of seismic receivers;
    computing properties of coherent noise for plural modes of the coherent noise, based on the received seismic data, to produce a model of the coherent noise for the plural modes; and
    simulating the coherent noise using the model to generate a synthetic noise.

2. The method of claim 1, further comprising subtracting the synthetic noise from seismic data.

3. The method of claim 1, wherein computing the properties of the coherent noise for the plural modes comprises computing noise model parameters for each mode.

4. The method of claim 3, wherein computing the noise model parameters comprises computing dispersion, amplitude, and attenuation parameters for each mode.

5. The method of claim 3, further comprising:
    producing parameter curves that are separated for the plural modes; and
    detecting the plural modes according to the separated parameter curves.

6. The method of claim 5, wherein producing the separated parameter curves comprises producing one or more of separated dispersion curves, separated attenuation curves, and separated amplitude curves.

7. The method of claim 1, further comprising:
    selecting shot gathers of the seismic data; and
    according to the selected shot gathers, identifying the plural modes.

8. The method of claim 1, further comprising:
    determining lateral variations along a line of seismic receivers; and
    selecting the group of seismic receivers that is a subset of the line of seismic receivers according to the determined lateral variation.

9. The method of claim 1, further comprising applying an f k analysis on the seismic data to extract dispersion curves, wherein the dispersion curves are part of the properties of the coherent noise.

10. The method of claim 1, wherein computing the properties of the coherent noise for the plural modes comprises computing the properties of the coherent noise for plural modes of propagation that include two or more of Rayleigh waves, Lamb waves, P guided waves, Love waves, and Scholte waves.

11. An article comprising at least one non-transitory computer readable storage medium containing instructions that when executed cause a computer to:
    receive seismic data collected by a group of seismic receivers;

compute properties of coherent noise for plural modes of the coherent noise, based on the received seismic data, to produce a model of the coherent noise for the plural modes; and simulate the coherent noise using the model to generate a synthetic noise.

12. The article of claim 11, wherein the instructions when executed cause the computer to further subtract the synthetic noise from seismic data.

13. The article of claim 11, wherein computing the properties of the coherent noise for the plural modes comprises computing noise model parameters for each mode.

14. The article of claim 13, wherein computing the noise model parameters comprises computing dispersion, amplitude, and attenuation parameters for each mode.

15. The article of claim 13, wherein the instructions when executed cause the computer to further:

produce parameter curves that are separated for the plural modes; and detect the plural modes according to the separated parameter curves.

16. The article of claim 11, wherein the instructions when executed cause the computer to further:

determine lateral variations along a line of seismic receivers; and select the group of seismic receivers that is a subset of the line of seismic receivers according to the determined lateral variation.

17. The article of claim 11, wherein computing the properties of the coherent noise for the plural modes comprises computing the properties of the coherent noise for plural modes of propagation that include one or more of Rayleigh waves, Lamb waves, Flexural waves, P or S- guided waves, Love waves, Stoneley waves and Scholte waves.

18. A computer comprising:

a non-transitory storage to store seismic data, and a processor to:

determine parameters of a model of coherent noise according to the seismic data, wherein the parameters include sets of parameters for plural modes of the coherent noise;

perform simulation, using the model and the associated sets of parameters for the plural modes, to produce synthetic noise; and subtract the synthetic noise from seismic data.

19. The computer of claim 18, wherein the each set of parameters includes a dispersion parameter, attenuation parameter, and amplitude parameter.

20. The computer of claim 18, wherein the plural modes comprise plural modes of propagation that include two or more of Rayleigh waves, Lamb waves, P guided waves, Love waves, and Scholte waves.

* * * * *